United States Patent [19]

Kohlstrung et al.

[11] Patent Number: 5,083,505

[45] Date of Patent: Jan. 28, 1992

[54] COOKING APPARATUS

[75] Inventors: Peter Kohlstrung, Kaufering; Ladislav Lafuntal, Esting, both of Fed. Rep. of Germany

[73] Assignee: LechMetall Landsberg GmbH, Fed. Rep. of Germany

[21] Appl. No.: 490,914

[22] Filed: Mar. 8, 1990

[30] Foreign Application Priority Data

Mar. 9, 1989 [DE] Fed. Rep. of Germany ... 8902903[U]

[51] Int. Cl.⁵ ............... A21B 1/00; A21B 1/22; F27D 11/00
[52] U.S. Cl. .................... 99/331; 99/339; 99/468; 99/476; 99/483; 126/21 A; 126/369; 219/401
[58] Field of Search ............... 99/326, 331, 357, 403, 99/417, 467, 468, 473–476, 483, 470; 219/401, 399, 398, 405, 411, 462; 126/20, 21 R, 21 A, 369; 426/243

[56] References Cited

U.S. PATENT DOCUMENTS

| 3,762,394 | 10/1973 | Newcomer | 99/403 |
| 3,837,272 | 9/1974 | Evich | 99/483 |
| 3,873,753 | 3/1975 | Nelson et al. | 99/483 |
| 3,943,841 | 3/1976 | Huang | 99/331 |
| 4,265,702 | 5/1981 | Prudhon et al. | 99/470 |
| 4,430,557 | 2/1984 | Eichelberger et al. | 99/417 |
| 4,839,502 | 6/1989 | Swanson et al. | 219/401 |

Primary Examiner—Timothy F. Simone
Attorney, Agent, or Firm—Hill, Van Santen, Steadman & Simpson

[57] ABSTRACT

A cooker comprising a cooking chamber and a means for introducing water into the cooking chamber in liquid or in steam form is disclosed, whereby the cooker is characterized in that it comprises a means for eliminating moisture from the cooking chamber, comprises at least one moisture sensor in the cooking chamber and comprises a control means that registers the output signals of the moisture sensor as first control parameter and compares them to a rated value and, according to the result of the comparison, drives the means for introducing water into the cooking chamber or the means for eliminating moisture from the cooking chamber.

11 Claims, 7 Drawing Sheets

COOKING APPARATUS

BACKGROUND OF THE INVENTION

The invention is directed to a cooking apparatus or cooker comprising a cooking chamber and a means for introducing water into the cooking chamber in liquid or in steam form.

Traditional cookers usually have a number of permanently set, selectable operating modes such as "steaming", "hot air" and combinations of "hot air" and "steam".

In practice, however, undesired humidity relationships are frequently established in the cooking chamber that derive from the nature of the material being cooked and from potential operations of the cooking process (for example, opening the door of the cooking chamber).

When, for example, chickens are cooked at a cooking chamber temperature of 200° C., the partial vapor pressure of the water already reaches one Bar after a few minutes, this being attributable to an emergence of the moisture from the material being cooked itself. Such a degree of humidity (what is understood here and below by "degree of humidity" is the partial vapor pressure of the water), however, is not desired. On the contrary, chickens should be cooked in an optimally moisture-free space (for example, a grill). Only in this way, namely, can it be assured that the skin becomes crisp.

In steamed products such as, for example, potatoes or vegetables, a 100% degree of humidity is desired (i.e., a partial vapor pressure of the water of one Bar given unpressurized operation as is assumed here and in the following with reference to the cooker of the invention).

Cookers known up to now control the steam production dependent on temperature, this leading thereto that a steam/air mixture that is more or less predictable in terms of its composition is often formed in the cooking chamber. The degree of humidity, however, is then usually too low.

Precooked foods that are to be reheated require a well-defined degree of humidity in the cooking chamber atmosphere. When the degree of humidity lies too low, there is the risk that the foods will dry out. When, however, the degree of humidity lies too high bubbles of water form on the plates or containers due to condensation and surfaces that were originally crispy become softened.

The object of the invention is to create a cooker where in the partial vapor pressure of the water in the atmosphere of the cooking chamber can be adapted to the nature of the material to be cooked.

These and other objects of this invention will become apparent from the following disclosure and appended claims.

SUMMARY OF THE INVENTION

In a cooker of the species initially cited, the stated object is inventively achieved by a means for eliminating moisture from the cooking chamber, by at least one humidity sensor in the cooking chamber and by a control means that registers the output signals of the humidity sensor as first control parameter and compares this to a rated value and, corresponding to the result of the comparison, drives the means for introducing water into the cooking chamber or the means for eliminating moisture from the cooking chamber.

The cooker of the invention enables the degree of humidity in the atmosphere of the cooking chamber to be suitably set to the material to be cooked and, as warranted, to be held thereat. When an especially crisp surface of the material being cooked is desired, then the rated value should be selected low, whereas a high rated value is to be prescribed when the material to be cooked is to be steamed. Medium rated values are prescribed for reheating foods.

It is provided in a preferred embodiment of the invention that the means for introducing water into the cooking chamber comprises a controllable steam generator. Many traditional cookers already comprise steam generators. This can be controlled by the control means of the invention.

Alternatively or in addition thereto, it can be inventively provided that the means for introducing water into the cooking chamber comprises at least one first, controllable injector for injecting water into the cooking chamber. Since the atmosphere in the cooking chamber is extremely hot during cooking, the water sprayed in with the first injector evaporates immediately and thus increases the degree of humidity in the atmosphere of the cooking chamber.

For executing the means for eliminating moisture from the cooking chamber, the invention provides a number of possibilities that can be alternatively or cumulatively realized:

The means for eliminating moisture from the cooking chamber can be inventively formed by a controllable auxiliary aerator for blowing air into the cooking chamber. The insufflated air absorbs moisture in the cooking chamber and is in turn eliminated via an aeration tube.

The means for eliminating moisture from the cooking chamber can also comprise at least one auxiliary baffle at the main aerator of the cooker, at least one bore in the supporting disk of the main aerator and least one controllably closable opening in the inside box wall of the cooker. As in the solution set forth above, additional air is thereby introduced into the cooking chamber. This absorbs moisture and is eliminated.

The additional air for absorbing and eliminating moisture from the cooking space can also be inventively formed by a controllably closable, double air baffle having at least one air admission in the direction toward the main aerator of the cooker.

The principle of eliminating moisture from the cooking chamber with air can also be realized in that at least one first controllable ventilator for the extraction of a damp medium is provided, whereby dry air can flow in as a consequence of the pressure drop so that the degree of humidity in the atmosphere of the cooking chamber drops overall. The dry air is supplied to the cooking chamber via the aeration tube.

The moist air can also be eliminated by at least one controllably closable chimney, whereby dry air can also flow in this case.

In a preferred embodiment of the invention, the means for eliminating moisture from the cooking chamber comprises an axially aligned, second injector discharging axially into a main pipe, comprises an extraction tube in communication with the cooking chamber that discharges into the main pipe downstream of the second injector, comprises an outlet arranged in the region of the end of the main pipe and comprises a controllable valve preceding the second injector. Main pipe and extraction tube thus form a blast nozzle (Venturi effect) through which moisture or, respectively, damp air is suctioned out of the cooking chamber into the main pipe. Dry air can also flow in in this case.

In the invention, finally, the means for eliminating moisture from the cooking chamber can also comprise one controllable condenser. The condenser can thereby comprise a line arranged in the cooking chamber that is controllably traversed by a coolant and can also comprise a condensed water discharge.

For refining the control, it can be inventively provided that at least one temperature sensor is arranged in the cooking chamber and that the control means receives signals from the temperature sensor and processes them as second control parameter.

In the invention, the rated value for the output signals of the moisture sensor can be adjustable.

The rated value can thereby be adjustable with a controller, with a digital key field or the like, being adjustable in accord with a partial water pressure of zero through one Bar.

However, it can also be provided that the rated value, corresponding to the nature of the product to be cooked, is adjustable with a selection switch, a key field or the like for inputting the nature of the product to be cooked, whereby the control means comprises a memory for storing rated values that are suitable for the various types of product to be cooked. In this case, the control means automatically sets the appropriate rated value.

BRIEF DESCRIPTION OF THE DRAWINGS

The invention shall be set forth in greater detail below in terms of the various embodiments thereof with reference to the drawings and in terms of further details.

Shown are.

Coinciding elements are consistently referenced with the same reference characters in the figures.

DESCRIPTION OF THE PREFERRED EMBODIMENT

All the cookers of the invention shown in the figures each respectively comprise a moisture sensor 40 and temperature sensor 60. Both the moisture sensor 40 as well as the temperature sensor 60 are arranged in a cooking chamber 10 of the cooker. The signals generated by the moisture sensor 40 and by the temperature sensor 60 are supplied to a control means of 50 via data lines 52 and, respectively, 62.

In accord with the signals of the moisture sensor 40 and the temperature sensor 60, the control means controls a means for introducing moisture into the cooking chamber 10 or controls a means for eliminating moisture from the cooking chamber 10.

For reasons of clarity, these two latter means are shown in different figures, even though they are inventively provided in one and the same cooker. A respective plurality of means for introducing and for eliminating moisture can also be provided in a single cooker.

In the cooker of the invention, aeration tubes 70 and 80 are provided in every embodiment according to the figures.

Figure 1:
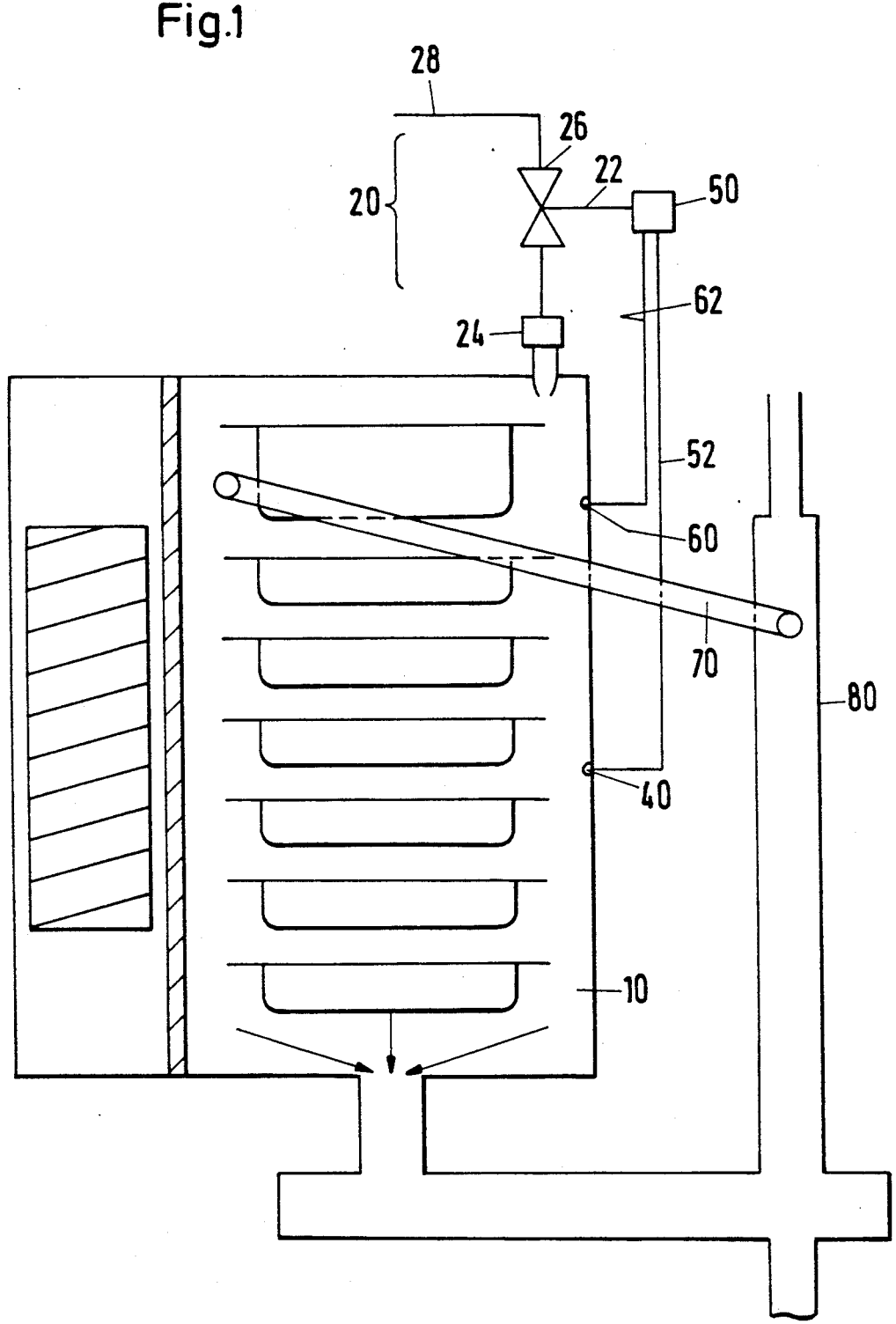
FIG. 1 is a preferred embodiment of the means for introducing moisture into the cooking chamber in the cooker of the invention.

Regarding the figures in detail:

FIG. 1, by way of example, shows a preferred embodiment of the means of the invention for introducing moisture into the cooking chamber 10. The said means is referenced with character 20. It comprises a control line 22 to the control means 50 with whose assistance a valve 26, preferably a solenoid valve, is driven. The solenoid valve feeds a first injector 24 from a water conduit 28 (for example, the public water mains). When the valve 26 is open, the first injector 24 sprays water into the cooking chamber 10, the degree of humidity of the atmosphere of the cooking chamber rising as a result thereof.

Figure 2:
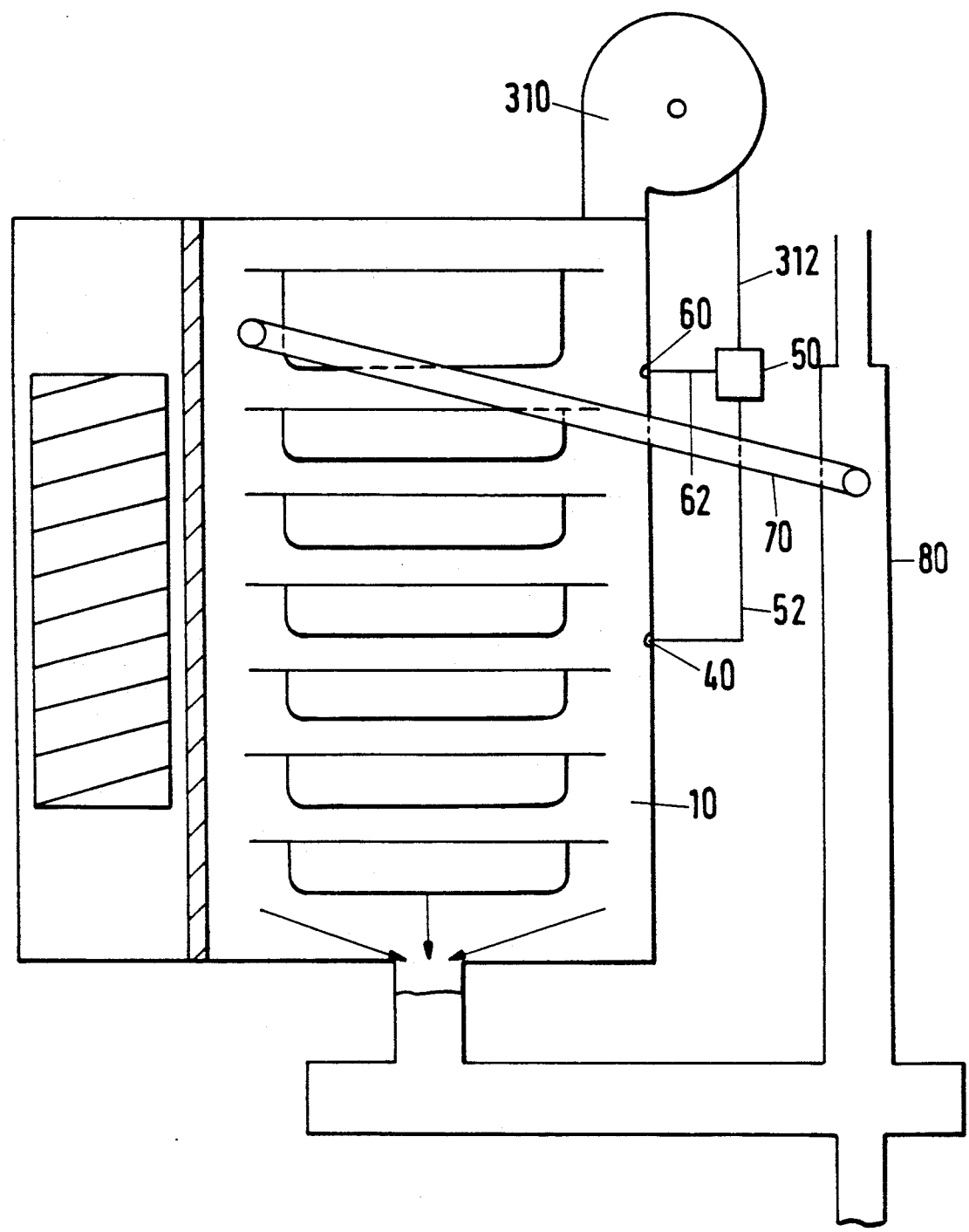
FIGS. 2-7 are preferred embodiments of the means of the invention for eliminating moisture from the cooking chamber in the cooker of the invention.

According to FIG. 2, the means for eliminating moisture from the cooking chamber 10 comprises an auxiliary aerator 310 that is controlled by the control means 50 via a control 312. When the auxiliary aerator 310 is activated, it blows dry ambient air into cooking chamber 10. The dry air absorbs moisture and subsequently departs the cooking chamber 10 via the aeration tube 70, the degree of moisture in the atmosphere of the cooking chamber dropping as a result thereof.

Figure 3:
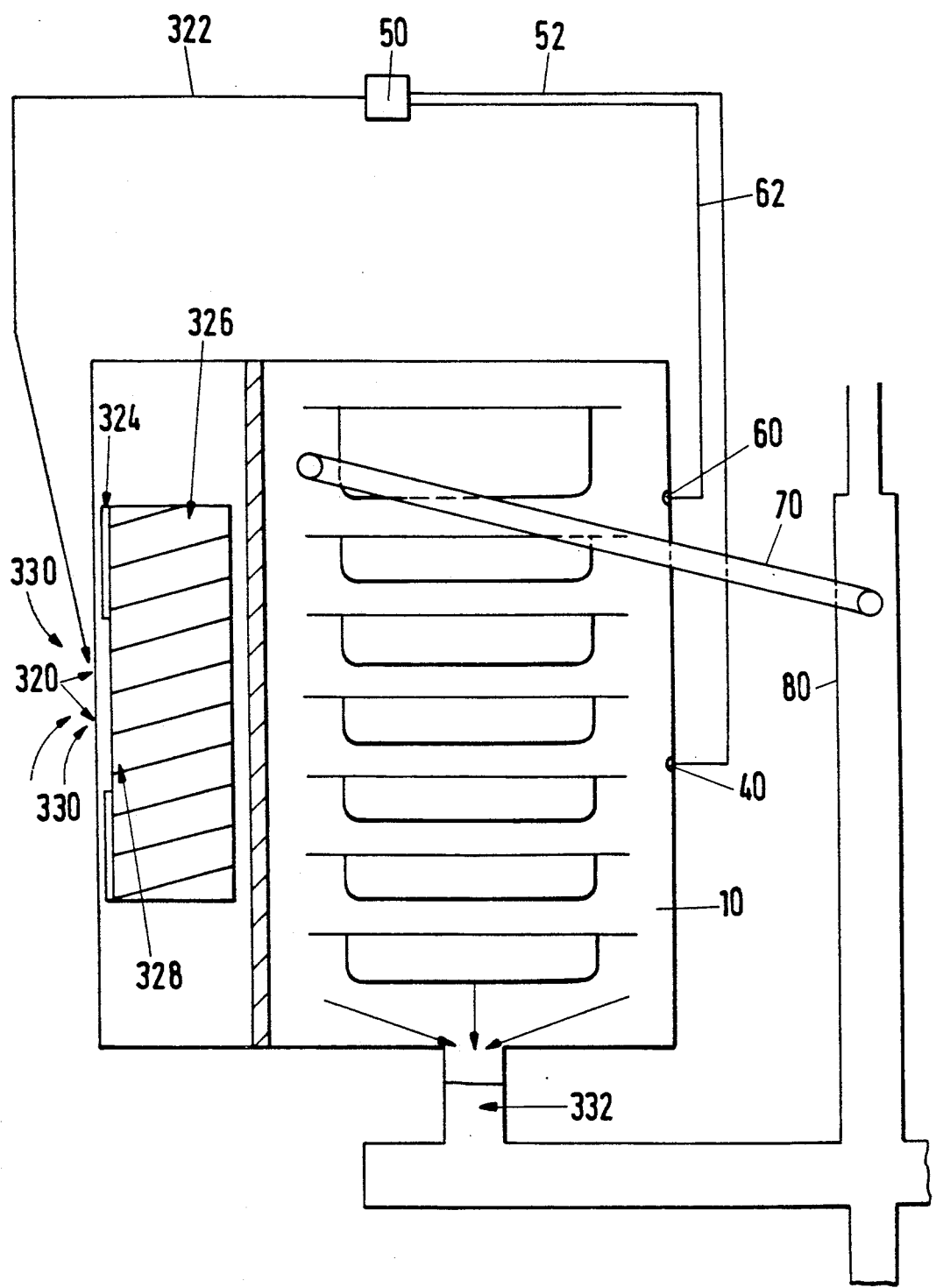

Given the means for eliminating moisture from the cooking chamber 10 of FIG. 3, dry ambient air 330 for absorbing moisture is introduced into the cooking chamber 10, similar to the case shown in FIG. 2. The air absorbs moisture in the cooking space 10 and is in turn eliminated from the cooking chamber 10 via an outlet 332 and/or the aeration tube 70, as a result whereof the degree of humidity in the atmosphere of the cooking chamber drops. Into this example and embodiment, the delivery of dry air ensues via auxiliary paddles 324 at the main aerator 326 of the cooker. During the operation of the main aerator 326, the auxiliary paddles 324 generate an under-pressure that effects the dry ambient air that flows into the cooking chamber 10 through openings 320 in the inside box wall of the cooker and bores 328 in the supporting disk of the main aerator 326. The openings 320 can be closed via a slide (not shown) that is turn controlled by the control means 50 via a control line 322.

Figure 4:
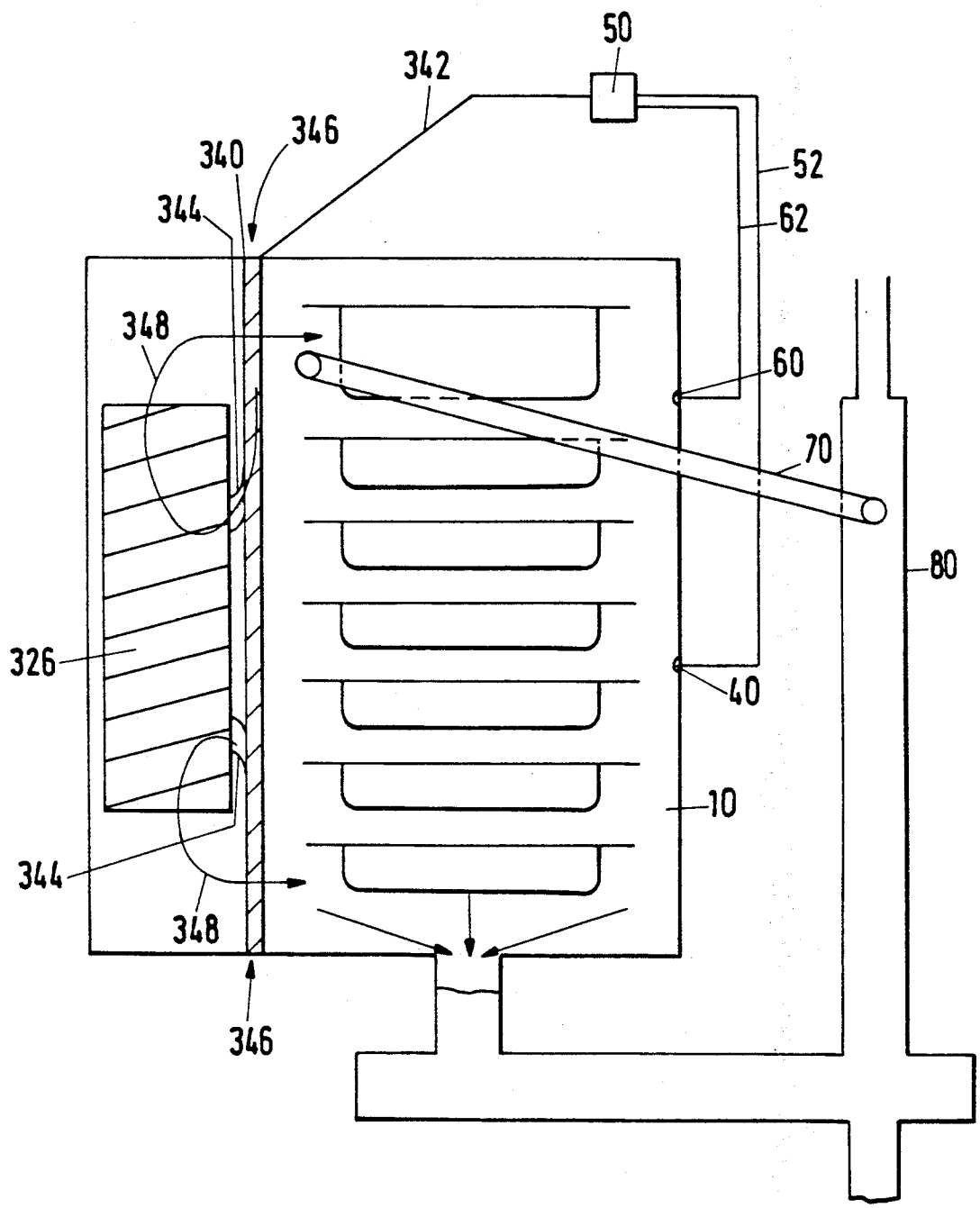

Given the exemplary embodiment of the means for eliminating moisture from the cooking chamber 10 according to FIG. 4, dry ambient air 346 is supplied to the cooking chamber 10 with a double air baffle 340 that comprises air admissions 344 to the main aerator 326, this being done because a corresponding under-pressure arises during operation of the main aerator 326. This effects that the dry ambient air 346 that can flow into the cooking chamber (see arrows 348) in order to absorb moisture there. The double air baffle 340 can be in turn closed with a slide (not shown) that is controlled by the control means 50 via a control line 342.

Figure 5:
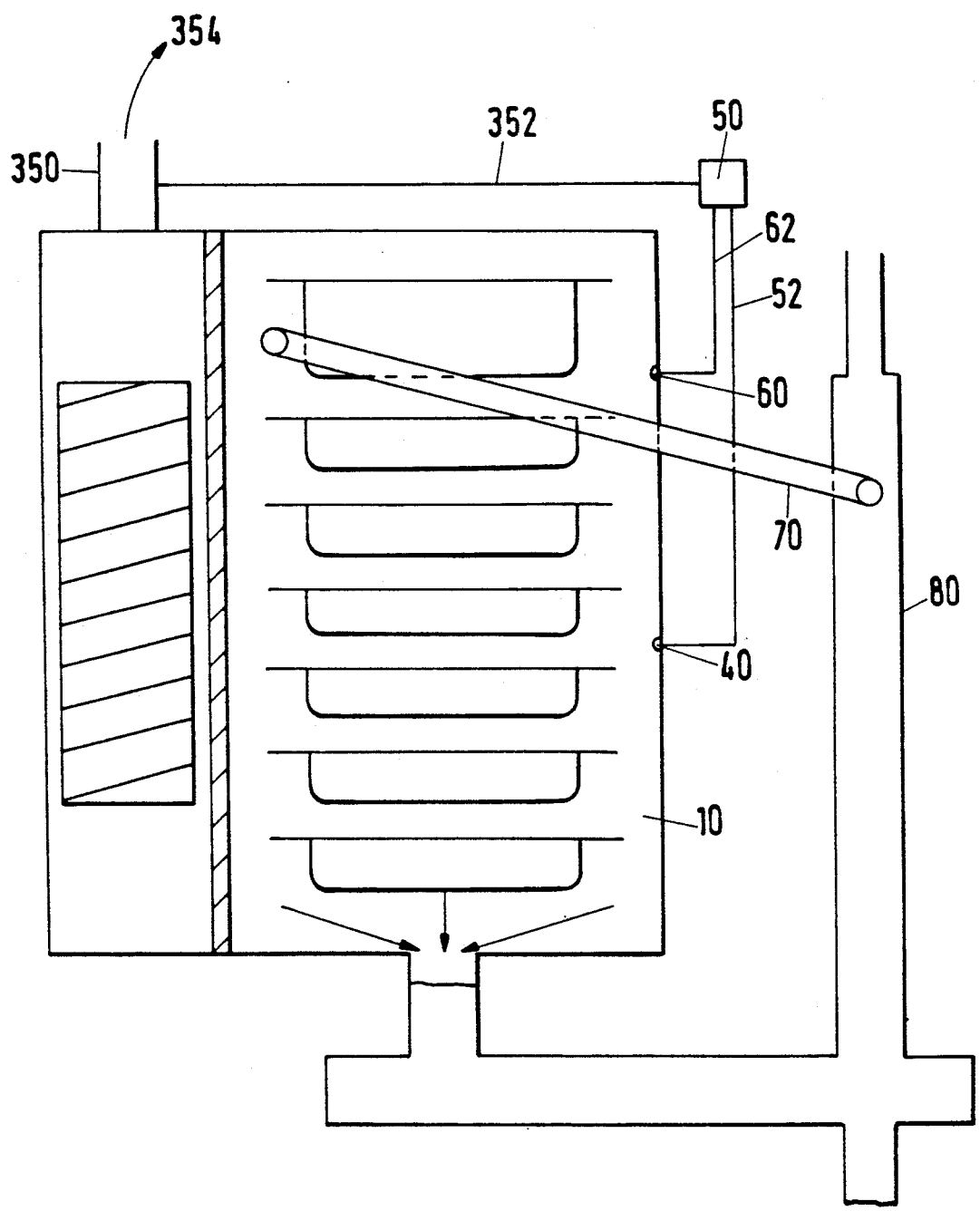

According to FIG. 5, damp medium 354 is extracted with a chimney 350, a pressure drop arising as a result thereof that effects an in-flow of dry ambient air through the aeration tube 70. The chimney 350 can be closed with a flap (not shown) that is controlled by the control means 50 via a control line 352.

Figure 6:
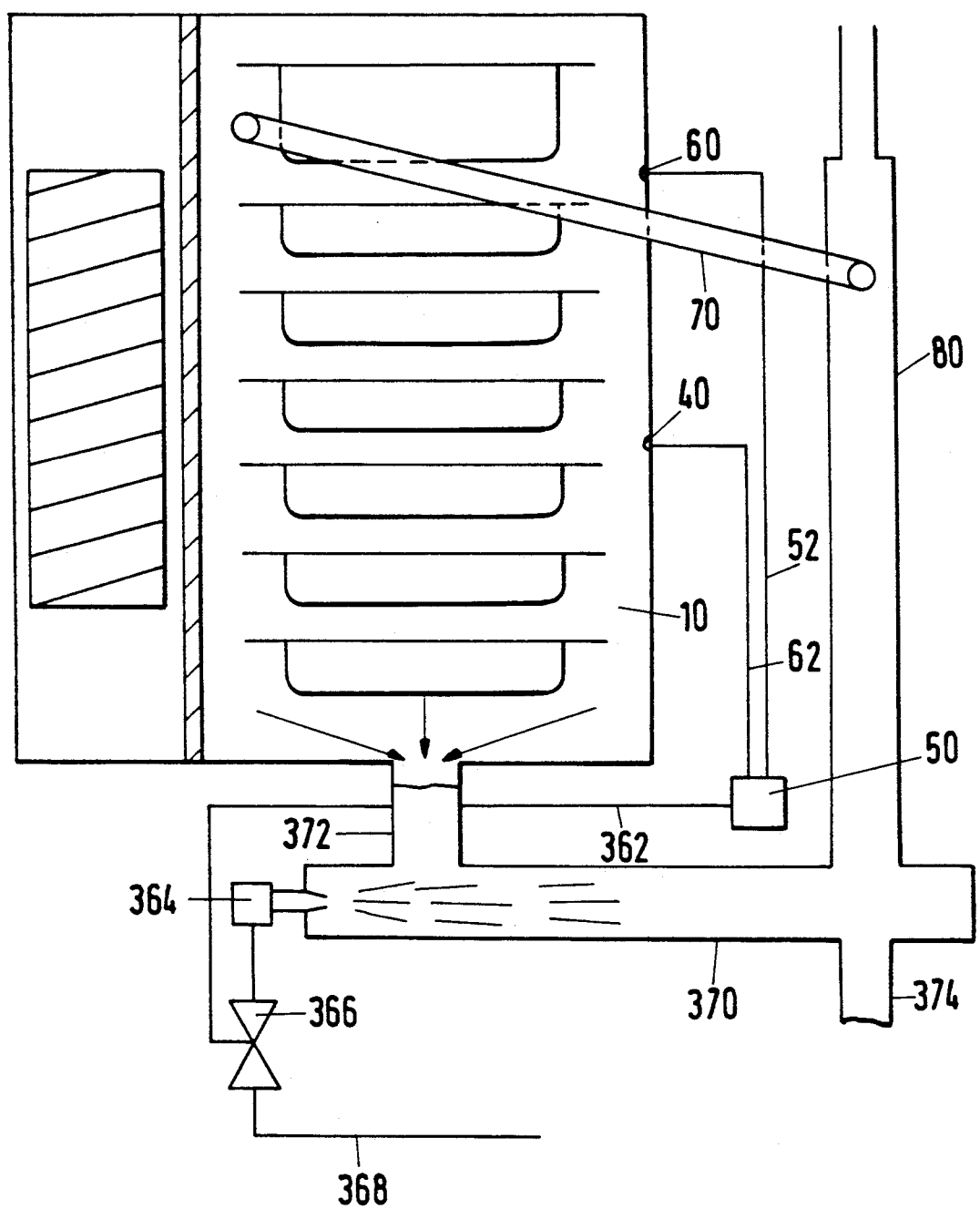

Given the means for eliminating moisture from the cooking chamber 10 of FIG. 6, damp medium is extracted—similar to the case shown in FIG. 5—in order to allow dry ambient air to flow in. According to FIG. 5, a second injector 364 is provided that axially discharges into a main pipe 370 and that is axially aligned. A second injector 364 is supplied by a water conduit 368 (for example, the public mains) via a controllable valve 366, preferably a solenoid valve. The valve 366 is controlled by the control means 50 via a control line 362. When the valve 366 is open, water emerges from the injector 364 into the main pipe 370 with high pressure, so that main pipe 370 and second injector 364 form a blast nozzle (Venturi effect). Under-pressure arising due to the flow effects that damp medium is extracted from the cooking chamber 10 and is replaced by dry ambient air. The water from the second injector 364 and the damp medium extracted therewith are eliminated through an outlet 374.

Figure 7:
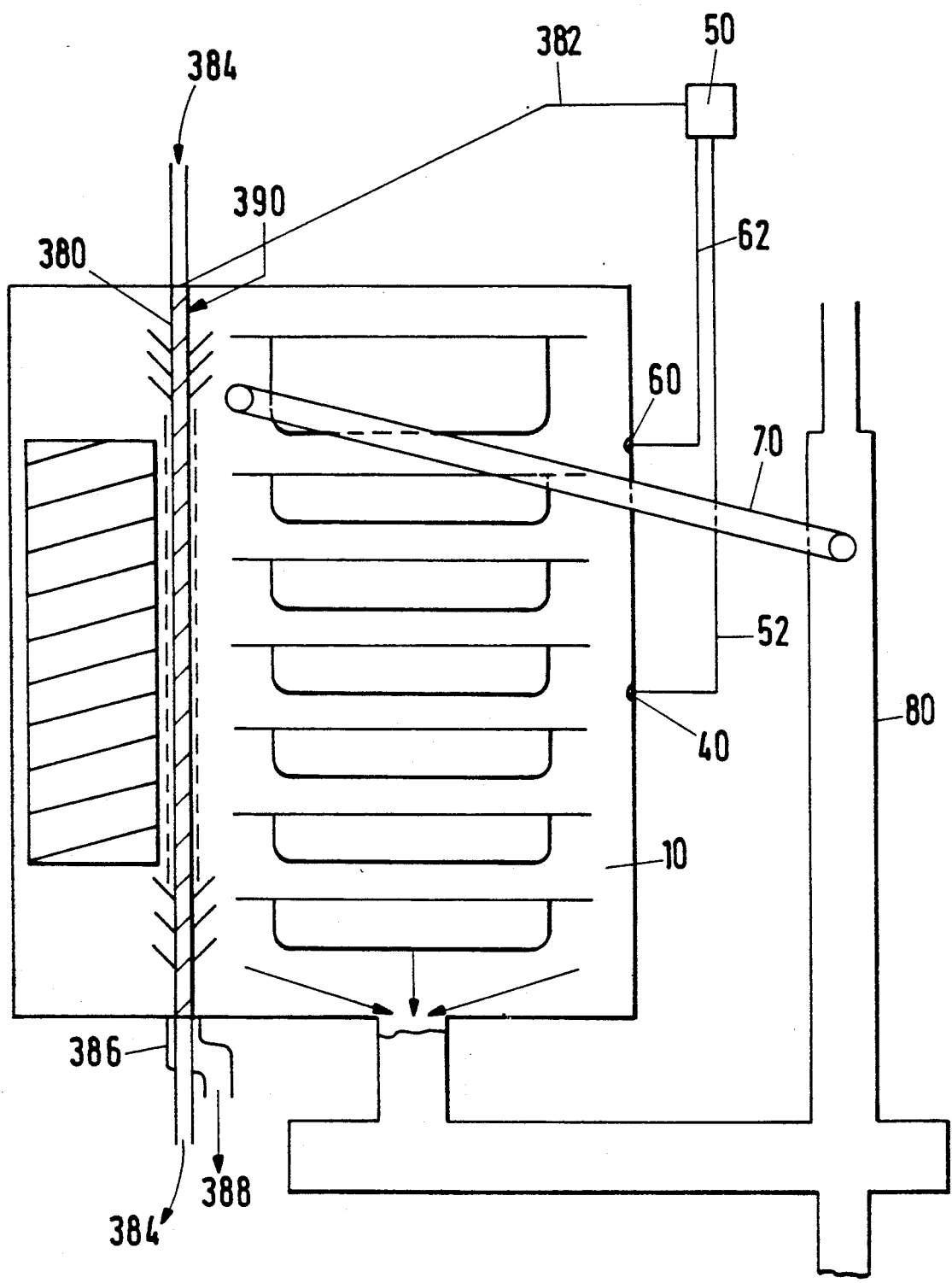

According to FIG. 7, the means for eliminating moisture from the cooking chamber 10 is formed by a condenser that comprises a line 380 arranged in the cooking chamber 10 and traversed by a coolant 384 and also comprises a condensed water discharge 386 for condensed water 388. The coolant flow is controlled by a valve (not shown) in the line 380 that is in turn connected to the control means 50 via a control line 382. When the control means 50 opens the valve, then, as a consequence of the coolant flow in the line 380, precipitation 390 is formed at the outside walls thereof and this is eliminated via the condensed water discharge 386 as condensed water 388.

The operation of the exemplary embodiments of the cooker of the invention shown in the drawing shall be set forth in detail below:

Dependent on whether the degree of humidity of the atmosphere in the cooking chamber reported by the moisture sensor exceeds or falls below a prescribed rated value, the control means 50 controls the means for introducing moisture into the cooking chamber 10 or the means for eliminating moisture from the cooking chamber 10. This means that the control means 50 opens the valve 26 of FIG. 1 when the rated value is downwardly exceeded. When the rated value is upwardly exceeded, it drives the auxiliary aerator 310 of FIG. 2 and/or opens the slide 320 or, respectively, 340 of FIGS. 3 or, respectively, 4, the flap of FIG. 5 and/or the controllable valve of FIGS. 6 or, respectively, 7.

By properly prescribing the rated value, thus, the degree of humidity in the atmosphere of the cooking chamber can be appropriately set to the nature of the product to be cooked and can be held thereat.

Various ways of prescribing the rated value can be provided in the invention.

First, the rated value can be manually prescribed, whereby a control, a digital key field or the like are preferably provided. The operating personnel can set a degree of humidity from zero percent through 100 percent with the assistance of the control, the digital key field or the like.

However, it can also be provided in the invention that the type of product to be cooked is input to the cooker via a key field or a selection switch or the like. In this case, the control means inventively comprises a memory in which rated values suitable for the types of product to be cooked that are to be prescribed are stored and that can be called in given a corresponding input of the product to be cooked.

The signals output by the temperature sensor 60 also preferably enter into the control as parameters.

Both individually as well as in arbitrary combinations, the features of the invention disclosed in the above specification, in the claims as well as in the drawing can be critical for realizing the various embodiments of the invention.

Although the invention has been described with respect to preferred embodiments, it is not to be so limited as changes and modifications can be made which are within the full intended scope of the invention as defined by the appended claims.

We claim as our invention:

1. A cooker comprising:
   (a) a cooking chamber (10);
   (b) a means (20) for introducing water into said cooking chamber (10) in liquid or in steam form, comprising a controllable steam generator and at least one first controllable injector (24) for spraying water into the cooking chamber (10);
   (c) a means (310, 312; 320 through 322; 340 through 348; 350 through 354; 360 through 374; 380 through 390) for eliminating moisture from said cooking chamber (10), having a controllable auxiliary aerator (310) for blowing air into the cooking chamber (10);
   (d) at least one moisture sensor (40) in said cooking chamber (10); and
   (e) a control means (50) that registers the output signals of the moisture sensor (40) as first control parameter and compares these to a rated value and, in accord with the result of the comparison, drives the means (20) for introducing water into the cooking chamber (10) or the means (13, 312; 320 through 332; 340 through 348; 350 through 354; 360 through 374; 380 through 390) for eliminating moisture from the cooling chamber (10), wherein said means (310, 312; 320 through 322; 340 through 348; 350 through 354; 360 through 374; 380 through 390) for eliminating moisture from the cooling chamber (10) further comprises:
   (f) at least one auxiliary baffle (324) at the main aerator (326) of the cooker;
   (g) the main aerator (326) having a support disk which has at least one bore (328); and
   (h) the cooker having an inside box wall which has at least one controllable closable opening (320).

2. A cooker according to claim 1, characterized in that the means (310, 312; 320 through 332; 340 through 348; 350 through 354; 360 through 374; 380 through 390) for eliminating moisture from the cooking chamber (10) comprises a controllably closable, double air baffle (340) having at least one air admission (344) to the main aerator (326) of the cooker.

3. A cooker according to claim 1, characterized in that the means (310, 312; 320 through 332; 340 through 348; 350 through 354; 360 through 374; 380 through 390) for eliminating moisture from the cooking chamber (10) comprises at least one first controllable ventilator for extracting damp medium.

4. A cooker according to claim 1, characterized in that the means (310, 312; 320 through 332; 340 through 348; 350 through 354; 360 through 374; 380 through 390) for eliminating moisture from the cooking chamber (10) comprises at least controllably closable chimney (350).

5. A cooker according to claim 1, characterized in that the means (310, 312; 320 through 332; 340 through 348; 350 through 354; 360 through 374; 380 through 390) for eliminating moisture from the cooking chamber (10) comprises the following:
   (a) an axially aligned second injector (364) axially discharging into a main pipe (370);
   (b) an extraction tube (372) communicating with the cooking chamber (10) and discharging into the main pipe (370) downstream from the second injector (364);

(c) an outlet (374) arranged in the region of the end of the main pipe (370); and (d) a controllable valve (366) preceding the second injector (364).

6. A cooker according to claim 1, characterized in that the means (310, 312; 320 through 332; 340 through 350 through 354; 360 through 374; 380 through 390) for eliminating moisture from the cooking chamber (10) comprises at least one controllable condenser (380, 384, 386).

7. A cooker according to claim 6, characterized in that said condenser (380, 384, 386) comprises a conduit (380) arranged in the cooking chamber (10) and controllably traversed by a coolant (384) and also comprises a condensed water discharge (386).

8. A cooker according to claim 1, characterized in that at least one temperature sensor (60) is arranged in the cooking chamber (10); and in that the control means (50) receives signals from said temperature sensor (60) and processes them as second control parameter.

9. A cooker according to claim 1, characterized in that the rated value for the output signals of the moisture sensor (40) is adjustable.

10. A cooker according to claim 9, characterized in that the rated value for the output signals of the moisture sensor (40) is adjustable with a control, to a partial water pressure of zero through one BAR.

11. A cooker according to claim 9, characterized by a selection switch for inputting the type of product to be cooked, whereby the control means comprises a memory for storing rated values that are suitable for the various types of product to be cooked.

* * * * *